United States Patent
Vecera et al.

(10) Patent No.: US 9,836,386 B2
(45) Date of Patent: Dec. 5, 2017

(54) AUTOMATIC SWITCH TO DEBUGGING MODE

(71) Applicant: Red Hat, Inc., Raleigh, NC (US)

(72) Inventors: Martin Vecera, Brno (CZ); Jiri Pechanec, Mokra-Horakov (CZ)

(73) Assignee: RED HAT ISRAEL, LTD., Raleigh, NC (US)

( * ) Notice: Subject to any disclaimer, the term of this patent is extended or adjusted under 35 U.S.C. 154(b) by 0 days.

(21) Appl. No.: 14/575,849

(22) Filed: Dec. 18, 2014

(65) Prior Publication Data

US 2016/0179655 A1    Jun. 23, 2016

(51) Int. Cl.
G06F 9/44       (2006.01)
G06F 11/36      (2006.01)
G06F 9/455      (2006.01)

(52) U.S. Cl.
CPC ...... *G06F 11/3664* (2013.01); *G06F 9/45558* (2013.01); *G06F 2009/45591* (2013.01)

(58) Field of Classification Search
CPC ............. G06F 11/3664; G06F 9/45558; G06F 2009/45591
USPC .................................................. 717/124, 125
See application file for complete search history.

(56) References Cited

U.S. PATENT DOCUMENTS

| | | | | |
|---|---|---|---|---|
| 6,256,752 B1* | 7/2001 | Blandy | ............... | G06F 11/3624 712/E9.084 |
| 7,478,404 B1* | 1/2009 | Campbell | ............. | G06Q 10/06 719/318 |
| 8,122,292 B2* | 2/2012 | Nanjundaswamy | ...................... | G06F 11/3636 714/34 |
| 8,522,209 B2* | 8/2013 | Wintergerst | ........ | G06F 11/3466 717/124 |
| 2002/0066071 A1* | 5/2002 | Tien | .......................... | G06F 8/20 717/102 |
| 2002/0143901 A1* | 10/2002 | Lupo | ...................... | G06Q 30/06 709/219 |
| 2005/0273667 A1* | 12/2005 | Shrivastava | ........ | G06F 11/0709 714/47.2 |
| 2006/0143531 A1* | 6/2006 | Kilian | ................. | G06F 11/3648 714/38.14 |
| 2008/0077780 A1* | 3/2008 | Zingher | .............. | G06F 11/3636 712/227 |

(Continued)

OTHER PUBLICATIONS

NPL—Russo-Eclipse Community Forums—2009, located at https://www.eclipse.org/forums/index.php/t/175714/.*

(Continued)

*Primary Examiner* — Hossain Morshed
(74) *Attorney, Agent, or Firm* — Haynes and Boone, LLP

(57) ABSTRACT

A system includes a processor and a memory comprising machine readable instructions that when executed by the processor, cause the system to receive command line instructions associated with execution of a Java virtual machine, the command line instructions associated with a set of rules for switching the Java virtual machine to a debugging mode, start execution of the Java virtual machine, start execution of an application on the Java virtual machine in a standard mode, during execution of the application, detecting an event that triggers a rule within the set of rules, and in response to the event, automatically switching the Java virtual machine from the standard mode to the debugging mode.

20 Claims, 4 Drawing Sheets

(56) References Cited

U.S. PATENT DOCUMENTS

| | | | |
|---|---|---|---|
| 2009/0307652 A1* | 12/2009 | Maybee | G06F 11/3644 717/104 |
| 2010/0125834 A1* | 5/2010 | Matic | G06F 11/3636 717/125 |
| 2010/0269091 A1* | 10/2010 | Barnes | G06F 11/366 717/106 |
| 2011/0321017 A1* | 12/2011 | Kapoor | G06F 11/362 717/129 |
| 2015/0033078 A1* | 1/2015 | Wintergerst | G06F 11/362 714/38.1 |
| 2015/0186238 A1* | 7/2015 | Lowe | G06F 11/27 714/30 |
| 2015/0236893 A1* | 8/2015 | Twiddy | H04L 67/02 709/223 |

OTHER PUBLICATIONS

NPL—Oracle-Java-Launch—2014, located at http://docs.oracle.com/javase/7/docs/technotes/tools/windows/java.html.*

NPL—Oracle—Troubleshooting Guide for Java SE Jun. 2010, located at http://www.oracle.com/technetwork/java/javase/toc-135973.html.*

NPL—JD Edwards-Event Debugging—2008, located at https://docs.oracle.com/cd/E13780_01/jded/acrobat/E1_TOOLS898TSA-B0908.pdf.*

NPL—NetBeans—Debugging with NetBeans IDE—2012, Captured in 2012 located at : https://netbeans.org/kb/docs/java/debug-multithreaded.html.*

JD Edwards, "JD Edwards EnterpriseOne Tools 8.98 Development Tools: Event Rules Guide", Sep. 2008, Oracle.*

Oracle—Troubleshooting, "Troubleshooting Guide for Java SE 8 with Hotspot VM", 2010, Oracle.*

Oracle-Java-Launch, "Java SE Documentation", 2014, Oracle.*

Java Virtual Machine. https://help.hana.ondemand.com/help/frameset.htm?da030d10d97610149defa1084cb0b2f1.html.

Developing on SAP JVM. https://help.sap.com/saphelp_nwpi71/helpdata/en/a6/11ac163573402c9b74490c37393322/contect.htm.

Dan Fabulich. "How to Set Up Hot Code Replacement with Tomcat and Eclipse." http://blog/redfin.com/deyblog2009/09/_how_to_set_up_hot_code_replacement_with_tomcat_and_eclipse.html#.VEae0CmSz40 Sep. 30, 2009.

3 Debugging Applications. http://docs.oracle.com/cb/E26576_01/doc/312/e24930/debugging-apps.htm 2012.

* cited by examiner

AUTOMATIC SWITCH TO DEBUGGING MODE

BACKGROUND

The present disclosure relates generally to software debugging, and more particularly to methods and systems for switching to a debugging mode.

Developing software for efficient operation on a variety of computing systems can be a difficult task. Such software often undergoes a substantial amount of testing. Despite this, bugs and other issues with a piece of software may still be found even after a piece of software is made available for customer use. Bugs may cause an application to behave improperly or crash during runtime.

Various tools can be used by developers to analyze how a specific piece of software will behave when executed. Such tools may allow the developer to view the processor state, stack frame, and other information as a program steps through execution. For example, software development kits often provide a debugging mode. In the case of Java, the Java virtual machine itself has a debugging mode. It is desirable to improve the manner in which developers can fix bugs and other errors of a piece of software.

SUMMARY

According to one example, a system includes a processor, a memory store, and a Java virtual machine configured to utilize the processor and the memory store, the Java virtual machine being configured to operate in a standard mode and a debugging mode. The memory includes a set of rules that define a plurality of events, and wherein the memory includes machine readable instructions that when executed by the processor, cause the system to: receive command line instructions associated with execution of the Java virtual machine, the command line instructions associated with the set of rules, start execution of the Java virtual machine, start execution of an application on the Java virtual machine while the Java virtual machine is in a standard mode, during execution of the application, detect an event that corresponds to a rule within the set of rules, determining that the event includes a switch indicia, and in response to the event, automatically switch the Java virtual machine from the standard mode to a debugging mode.

According to one example, a method performed by a computing system, the method comprising: with the computing system, starting a Java virtual machine with command line arguments, the command line arguments indicating a set of rules, the rules defining conditions under which the Java virtual machine is to switch from a standard mode to a debugging mode, with the computing system executing an application on the Java virtual machine while the virtual machine is in the standard mode, with the computing system, while executing the application, detecting an event, with the computing system, comparing the event to the set of rules, with the computing system, automatically switching from the standard mode to the debugging mode in response to detecting that the event corresponds to a rule within the set of rules.

According to one example, a computer program product stored on a non-transitory computer readable medium, the computer program product comprising machine readable instructions that when executed by a processor of a computing system, cause the system to: start a Java virtual machine with command line arguments, the command line arguments indicating a set of rules, the rules defining conditions under which the Java virtual machine is to switch from a standard mode to a debugging mode, execute an application on the Java virtual machine while the virtual machine is in the standard mode, and automatically switch from the standard mode to the debugging mode in response to detecting one of the conditions.

DETAILED DESCRIPTION

Figure 1:
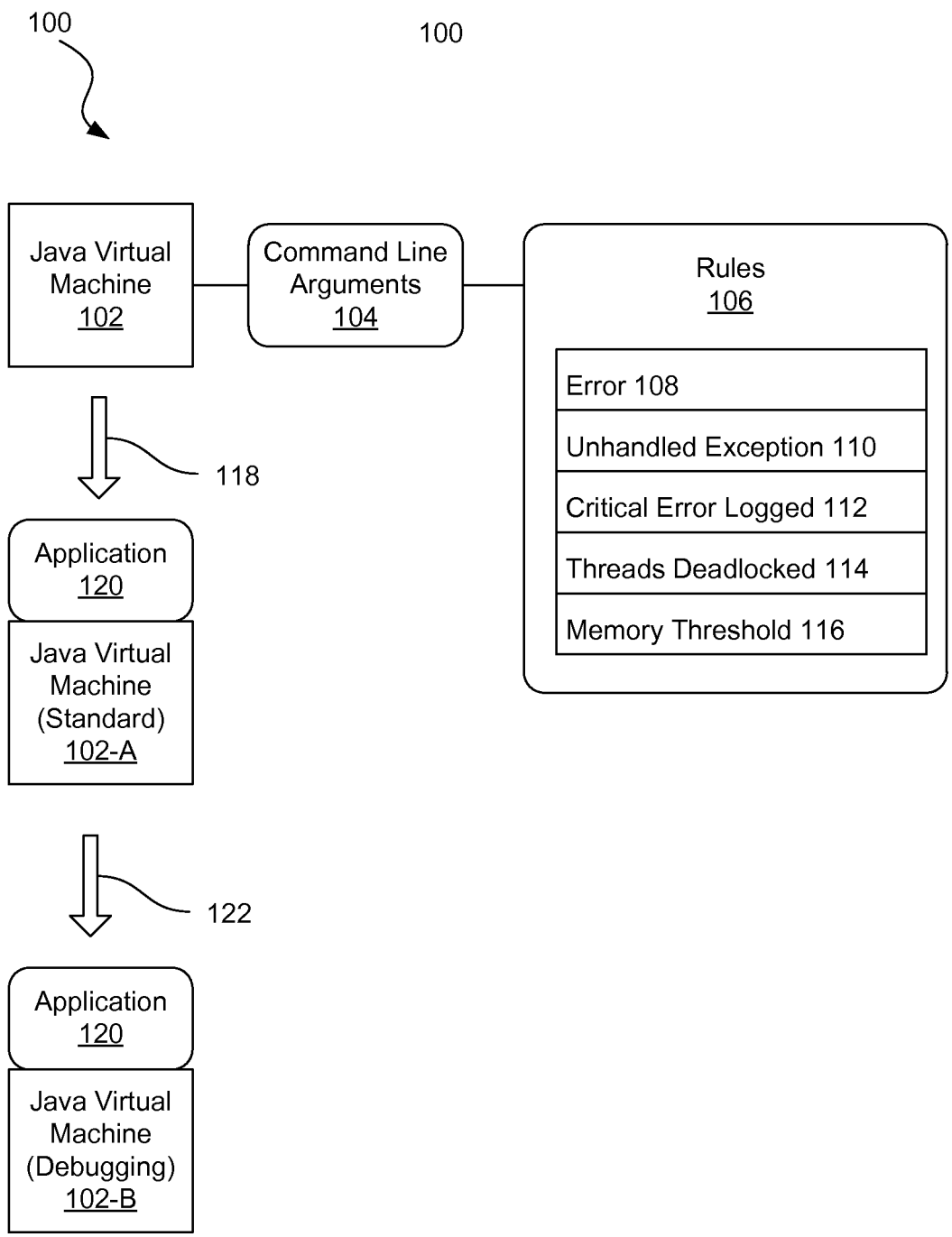
FIG. 1 is a diagram showing an illustrative process for automatically switching a Java virtual machine into a debugging mode, according to one example of principles described herein.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to improve the manner in which developers handle errors and other issues with a particular piece of software. Many pieces of software are written in Java. Java source code is compiled into Java bytecode. The Java bytecode is designed for execution on a Java virtual machine (Java virtual machine). The Java virtual machine can be designed to work with many different types of computing systems. For example, to run on a computing system that has x86 architecture, the Java virtual machine "translates" the Java bytecode into machine code instructions that are specific to an x86 processor.

The Java virtual machine includes a debugging mode. To use the debugging mode, a software developer may type specific command line arguments in addition to the name of the program to be executed. The specific command line arguments instruct the Java virtual machine to execute the named program in debugging mode. While in debugging mode, several tools are offered to the developer. For example, the developer may step through the code line by line and see how each instruction affects the program counter, stack frame, processor registers, and other detailed information. But, sometimes errors occur during runtime of a piece of software. Such errors may have the potential to be quickly fixed, therefore allowing continued execution of the piece of software.

According to principles described herein, the Java virtual machine is provided with a set of conditions under which the Java virtual machine will automatically switch from the standard mode to the debugging mode during execution of a program. This may be done by having a list of events that, when detected, trigger the Java virtual machine to switch from the standard mode to the debugging mode. For example, one of the conditions may be an out of memory error. Thus, while running an application, the Java virtual machine will automatically switch from standard mode to debugging mode in response to detecting an out of memory error. A developer may then be able to analyze the situation that may have caused this error, provide a fix, and allow the program to then continue execution.

It is noted that while the following description uses the example wherein the source code is Java and the compiled Java code is executed on a Java virtual machine, it is understood that principles described herein may be applied to other source code languages. For example, other types of code that run on a virtual machine that can switch into debugging mode may operate according to principles described herein.

FIG. 1 is a diagram showing an illustrative process for automatically switching a Java virtual machine into a debugging mode. According to the present example, when a Java virtual machine 102 is started, it is configured with a set of rules 106 that define when the Java virtual machine 102 should switch from the standard mode to the debugging mode. In one example, these rules 106 can be referenced by command line arguments 104. In this example, the rules 106 include errors 108, unhandled exceptions 110, logging of critical errors 112, deadlocked threads 114, and exceeding of a memory threshold 116. Other conditions may be used in accordance with principles described herein.

Command line arguments, sometimes referred to as parameters, are information provided to a program when the program is started. The command line arguments may specific the location of additional information for the program to use or may configure the program in one or more ways. For example, when starting the Java virtual machine, a particular command line argument may specify a configuration file that includes a list of conditions or rules 106 that trigger switching from standard mode to debugging mode.

In some examples, specific rules 106 may correspond with specific command line options, which are sometimes referred to as flags. Thus, when starting the Java virtual machine 102, a user may be able to specify which rules should be applied when considering when to switch from standard mode to debugging mode. For example, a user may want the Java virtual machine to switch to debugging mode in response to an error 108 but not in response to unhandled exceptions 110 and other situations.

One of the rules 106 that triggers a switch from standard mode to debugging mode is detection of an error 108 such as an out of memory error. An error is an even that generally cannot be caught and handled, and will typically cause a program to crash. Some examples of errors are a no class definition found error, or an unsupported class version error. Other errors may relate to unavailable system resources.

Another one of the rules 106 that triggers a switch from standard mode to debugging mode is detection of an unhandled exception 110. Exceptions are errors that can be caught and handled. Specifically, the Java language includes "try" and "catch" which allow the developer to anticipate certain scenarios and account for, or handle such exceptions. One example of an exception is an input/output exception or a null pointer exception.

Another one of the rules 106 that triggers a switch from standard mode to debugging mode is detection of a critical error that is logged 112. Critical errors are generally more serious than non-critical errors. Critical errors can be defined as those that require notification to a user. This may be because a critical error may involve corruption of data or other issues that may be important for a user to know.

Another one of the rules 106 that triggers a switch from standard mode to debugging mode is detection of one or more threads that have become deadlocked 114. Threads refer to the smallest unit of codes that can be scheduled by a scheduler. Sometimes two or more different threads may become deadlocked. Deadlocks may occur because two threads are waiting on information from each other before continuing. For example, one thread may enter a waiting state because a requested resource is held by another waiting process, which is waiting for another resource.

Another one of the rules 106 that triggers a switch from standard mode to debugging mode is detecting that used memory has exceeded a predefined threshold. The rule may indicate a specific threshold value over which the amount of used memory should not exceed. If in fact the used memory does exceed that value, then the Java virtual machine will switch from standard mode to debugging mode. Exceeding the threshold may indicate that there is a memory leak. Thus, a developer can analyze the situation and determine if there is in fact a memory leak before allowing the application to continue.

After applying the rules that specific conditions under which the Java virtual machine is to switch modes, an application 120 is loaded 118 and begins execution on the Java virtual machine 102-A. At this time the Java virtual machine 102-A is in standard mode. During execution of the application 120, an event 122 occurs that triggers a switch from standard mode 102-A to debugging mode 102-B. The event may be caused by any condition specified in the configuration of the Java virtual machine 102. By switching to debugging mode, a developer may analyze the situation, diagnose the issue, and provide a fix. After the fix has been implemented, the Java virtual machine can return to standard mode 102-A and the application 120 can continue execution.

Figure 2:
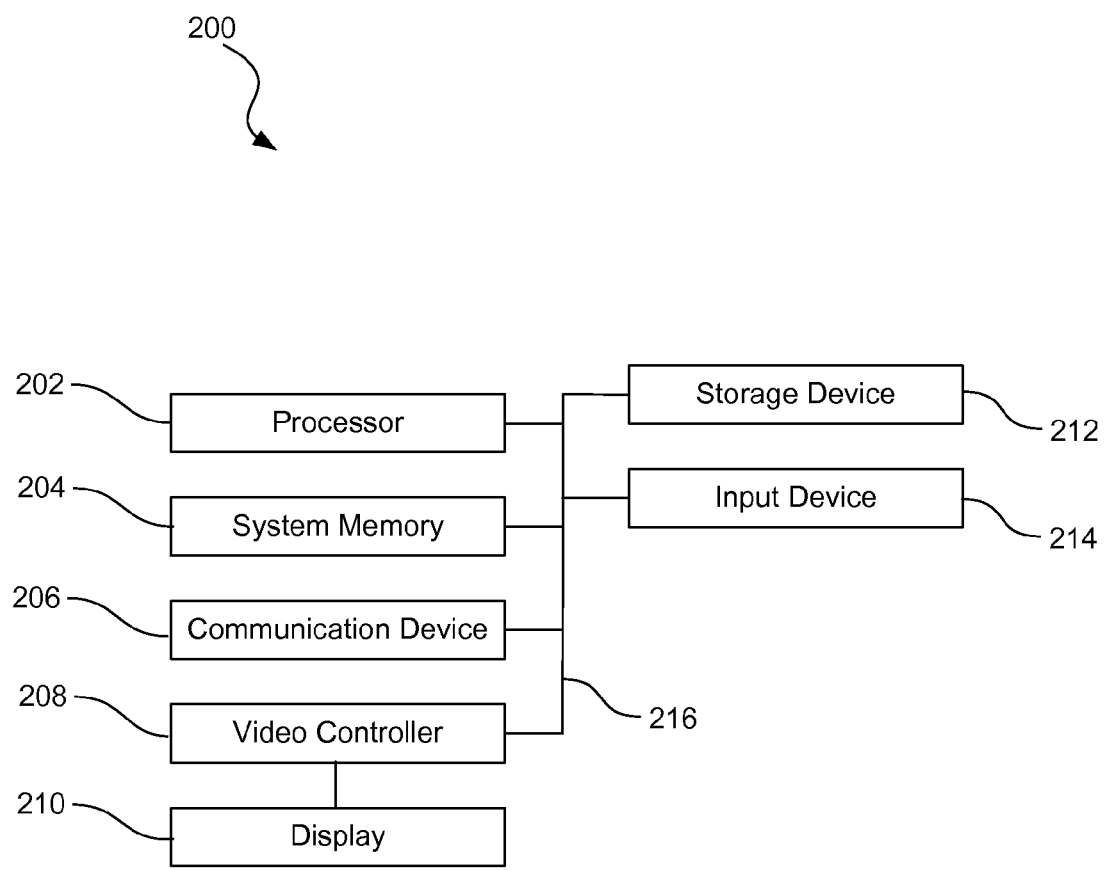
FIG. 2 is a diagram showing illustrative components of a computing system that can run a Java virtual machine capable of automatically switching to a debugging mode, according to one example of principles described herein.

FIG. 2 is a diagram showing illustrative components of a computing system that can run a Java virtual machine capable of automatically switching to a debugging mode. For example, the computing system 200 may run the Java virtual machine 102 described in FIG. 1. According to the present example, the computing system 200 includes a processor 202, an input device 214, a storage device 212, a video controller 208, a system memory 204, a display 210, and a communication device 206, all of which are interconnected by one or more buses 216.

The storage device 212 may include a computer readable medium that can store data. The storage device 212 may include volatile memory storage devices such as Random Access Memory (RAM) as well as non-volatile memory storage devices such as solid state memory components. The computer readable medium may be a non-transitory tangible media.

In some examples, the communication device 206 may include a modem, network card, or any other device to enable the computing system 200 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 200 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 204, and/or any combination thereof, may be executed by a processor 202 to cause the processor 202 to carry out or implement in whole or in part the operation of the computing system 200, one or more of the methods. In some examples, such a processor 202 may execute the plurality of instructions in connection with a virtual computer system.

Figure 3:
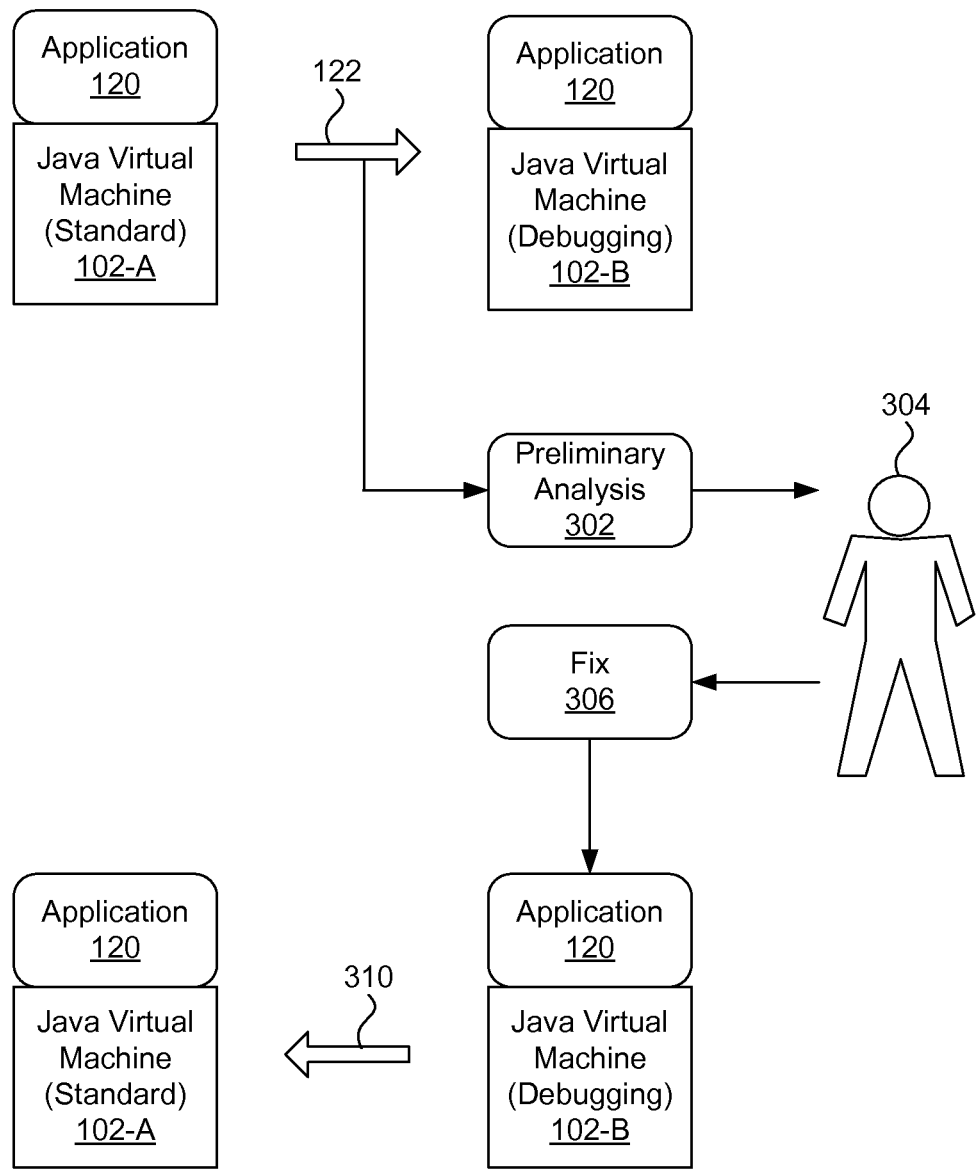
FIG. 3 is a diagram showing illustrative features related to switching between a standard mode and a debugging mode, according to one example of principles described herein.

FIG. 3 is a diagram showing illustrative features related to switching between a standard mode and a debugging mode. As described above, an application 120 is executing on the Java virtual machine 102-A while the Java virtual machine 102-A is in standard mode. In response to an event 122, the Java virtual machine 102-B switches to debugging mode. According to the present example, in addition to switching to debugging mode, a programmer 304 is provided with a preliminary analysis 302 of the event 122 that caused the switch.

In one example, the preliminary analysis 302 is provided by an automated script that executes when the Java virtual machine 102 switches from standard mode to debugging mode. The preliminary analysis 302 may provide a report to the programmer 304. The report may provide details about the event 122 that caused the switch. The type of details provided may depend on what rule caused the switch from standard mode to debugging mode. For example, if the switch was caused by an out of memory error, then the report may provide details about the memory systems of the computing system that is running the Java virtual machine 102.

The automated script that provides the preliminary analysis 302 may perform other tasks as well. For example, the automated script may manipulate the memory heap and perform simple fixes to keep the Java virtual machine 102 in production. The memory heap refers to a pool of available memory that can be dynamically assigned.

In some examples, the Java virtual machine 102-A is running on a server and the application 120 provides services to multiple clients. The programmer can then connect to the Java virtual machine 102 remotely through a specified port. In some examples, the port may be specified through command line arguments or the configuration file referenced by the command line arguments.

After receiving the preliminary analysis 302, the programmer 304 can provide a fix 306 for the issue that caused the Java virtual machine 102 to switch into debugging mode. For example, the programmer 304 may rewrite portions of code. Or, the programmer may make changes to the system state. After the fix 306 has been implemented, the Java virtual machine 102 can be switched back to the standard mode. The, the application 120 can continue to run. In some examples, the application may continue execution where it left off. Thus, the application 120 does not have to be restarted.

Figure 4:
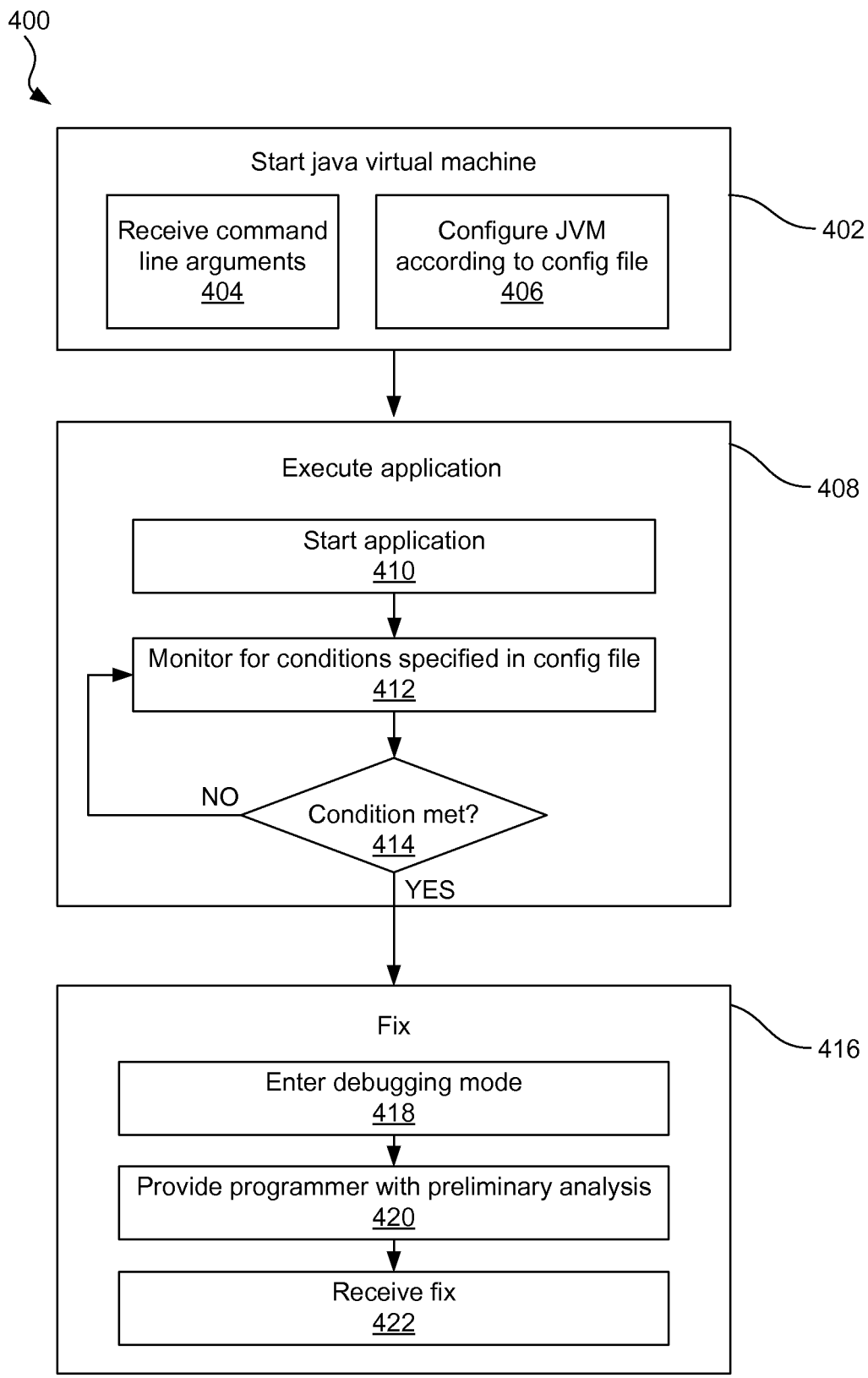
FIG. 4 is a flowchart showing an illustrative method for automatically switching to a debugging mode, according to one example of principles described herein.

FIG. 4 is a flowchart showing an illustrative method for automatically switching to a debugging mode. According to the present example, the method 400 includes a step 402 for staring a Java virtual machine. The Java virtual machine may be running on a server. Thus, the Java virtual machine may translate Java bytecode into machine readable instructions for the processor architecture of the server.

Starting the Java virtual machine includes a step 404 for receiving command line arguments. The command line arguments are used to configure the Java virtual machine by providing it with a set of rules under which it should be switched from the standard mode to the debugging mode. As described above, command line options or flags may also be used to identify specific rules or specific types of rules that indicate when the Java virtual machine should be switched to debugging mode.

Starting the Java virtual machine also includes a step 406 for configuring the Java virtual machine according to a configuration file. The configuration file may be referenced by the command line arguments. For example, there may be several rules and conditions to be considered for when the Java virtual machine should switch modes. These rules and conditions can be defined in a configuration file. The command line arguments may then reference that configuration file. The configuration file may also specify a port through which the developer can connect to the server running the JVM and fix an issue after the Java virtual machine switches to debugging mode.

The method 400 further includes a step 408 for execution an application. Executing an application includes a step 410 for starting the application. When the application is started, the Java virtual machine is in the standard mode. Thus, the application runs as designed.

Executing the application further includes a step 412 for monitoring for conditions specified in the configuration file. For example, if the configuration file indicates that the Java virtual machine should switch from standard mode to debugging mode when an unhandled exception is thrown, then execution of the application will be monitored for unhandled exceptions. At step 414, it is determined whether a condition has been met. If no condition has been met, then the method 400 returns to step 412 and continues the monitoring. If, however, a condition is met, then the method proceeds to step 416. Detecting that a condition has been met may include detecting an event that has a switch indicia. For example, the conditions may specify a plurality of events. Those events may include a switch indicia. Thus, when such events are detected during the monitoring step, a switch from the standard mode to the debugging mode is triggered.

The method 400 further includes a step 416 for fixing the issue associated with the condition that was found. The fix 416 includes a step 418 for entering debugging mode. Thus, the Java virtual machine switches from the standard mode to the debugging mode. While this may adversely affect the performance of the application, it allows a programmer, technician, or engineer to diagnose and fix the issue.

The fixing step 416 further includes a step 420 for providing the programmer with a preliminary analysis. As described above, a script may be automatically executed when the Java virtual machine switches from standard mode to debugging mode. The script may cause the underlying system to perform an analysis and provide a report to a programmer. The report may provide important information related to the condition that caused the Java virtual machine to switch from the standard mode to the debugging mode.

The fixing step 416 further includes a step 422 for receiving the fix from the programmer, technician, or engineer. The fix may be one of a variety of solutions. In some cases, the programmer may make changes to the code itself. In some examples, the programmer may make adjustments to the state of the physical computing system that is running the Java virtual machine. For example, the programmer may manually free up more memory. A programmer may also free up other resources that may be causing issues such as deadlocked threads.

Through use of principles described herein, a software application can be managed more efficiently. Specifically, when issues arise, a programmer, software developer, engineer, or technician may be able to quickly diagnose the issue and fix it without having to take the application entirely offline and restart the application. For applications that run on a server and serve multiple clients, this can be especially beneficial because the downtime for the application is reduced.

Some examples of processing systems described herein may include non-transitory, tangible, machine readable media that include executable code that when run by one or more processors (e.g., processor 202) may cause the one or more processors to perform the processes of method 400 as described above. Some common forms of machine readable media that may include the processes of method 400 for example, floppy disk, flexible disk, hard disk, magnetic tape, any other magnetic medium, an optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
a processor;
a memory store; and
a Java virtual machine configured to utilize the processor and the memory store,
the Java virtual machine being configured to operate in a standard mode and a debugging mode;
wherein the memory includes a set of rules that define a plurality of events, and wherein the memory includes machine readable instructions that when executed by the processor, cause the system to:
receive command line instructions associated with execution of the Java virtual machine, the command line in associated with the set of rules;
start execution of the Java virtual machine: start execution of an application on the Java virtual machine while the Java virtual machine is in a standard mode;
during execution of the application, detect an event that corresponds to a rule within the set of rules;
in response to the event, automatically switch the Java virtual machine from the standard mode to a debugging mode; and
executing a script that manipulates a memory heap to fix a problem associated with the event while keeping the Java virtual machine in production;
wherein the event comprises one of: detecting an error, detecting that an unhandled exception is thrown, detecting that two or more threads are dead-locked, detecting that memory consumption has exceeded a predefined threshold, or detecting that a critical error has been logged.

2. The system of claim 1, wherein the event comprises detecting an error.

3. The system of claim 2, wherein the error comprises an out of memory error.

4. The system of claim 1, wherein the event comprises detecting that an unhandled exception is thrown.

5. The system of claim 1, wherein the event comprises detecting that two or more threads have become deadlocked.

6. The system of claim 1, wherein the event comprises detecting that memory consumption has exceeded a predefined threshold.

7. The system of claim 1, wherein the event comprises detecting that a critical error has been logged.

8. The system of claim 1, further comprising, while in the debugging mode, receiving instructions from a human user to handle an issue associated with the event.

9. The system of claim 8, wherein the system is further to switch back from the debugging mode to the standard mode after receiving the instructions from the human user.

10. The system of claim 1, wherein the system is further to, in response to switching to the debugging mode, executing a script that provides an analysis of the event that triggered the switching.

11. The system of claim 10, wherein the script is further to manipulate a memory heap.

12. A method performed by a computing system, the method comprising:
   with the computing system, starting a Java virtual machine with command line arguments, the command line arguments indicating a set of rules, the rules defining conditions under which the Java virtual machine is to switch from a standard mode to a debugging mode;
   with the computing system executing an application on the Java virtual machine while the virtual machine is in the standard mode;
   with the computing system, while executing the application, detecting an event;
   with the computing system, comparing the event to the set of rules;
   with the computing system, automatically switching from the standard mode to the debugging mode in response to detecting that the event corresponds to a rule within the set of rules, the event comprising one of:
   detecting an error, detecting that an unhandled exception is thrown, detecting that two or more threads are dead-locked, detecting that memory consumption has exceeded a predefined threshold, or detecting that a critical error has been logged; and
   with the computing system, executing a script that manipulates a memory heap to fix a problem associated with the event while keeping the Java virtual machine in production.

13. The method of claim 12, wherein the set of rules are stored in a configuration file, the command line arguments referencing the set of rules.

14. The method of claim 12, further comprising, while in the debugging mode, receiving a change to code associated with the event that triggered the switching from the standard mode to the debugging mode.

15. The method of claim 12, further comprising, switching back from the debugging mode to the standard mode.

16. The method of claim 15, further comprising, resuming execution of the application after switching back to the standard mode.

17. The method of claim 12, further comprising, executing an automated script, the script providing a preliminary analysis of a state of the application.

18. A computer program product stored on a non-transitory computer readable medium, the computer program product comprising machine readable instructions that when executed by a processor of a computing system, cause the system to:
   start a Java virtual machine with command line arguments, the command line arguments indicating a set of rules, the rules defining conditions under which the Java virtual machine is to switch from a standard mode to a debugging mode;
   execute an application on the Java virtual machine while the virtual machine is in the standard mode;
   automatically switch from the standard mode to the debugging mode in response to detecting one of the conditions, the conditions comprising one of; detecting an error, detecting that an unhandled exception is thrown, detecting that two or more threads are dead-locked, detecting that memory consumption has exceeded a predefined threshold, or detecting that a critical error has been logged; and
   execute a script that manipulates a memory heap to fix a problem associated with the event while keen the Java virtual machine in production.

19. The computer program product of claim 18, wherein the error is an out of memory error.

20. The computer program product of claim 18, wherein the machine readable instructions are further to cause the system to, in response to switching to the debugging mode, providing a preliminary analysis of a condition that triggered the switch.

* * * * *